(12) United States Patent
Shi et al.

(10) Patent No.: US 11,038,434 B2
(45) Date of Patent: Jun. 15, 2021

(54) MODULAR MULTILEVEL CONVERTER AND POWER ELECTRONIC TRANSFORMER

(71) Applicant: Siemens Aktiengesellschaft, Munich (DE)

(72) Inventors: Lei Shi, Beijing (CN); Ji Long Yao, Beijing (CN); Yan Feng Zhao, Beijing (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/078,083

(22) PCT Filed: Feb. 21, 2017

(86) PCT No.: PCT/EP2017/053833
§ 371 (c)(1),
(2) Date: Aug. 21, 2018

(87) PCT Pub. No.: WO2017/144430
PCT Pub. Date: Aug. 31, 2017

(65) Prior Publication Data
US 2019/0058412 A1     Feb. 21, 2019

(30) Foreign Application Priority Data
Feb. 23, 2016   (CN) .......................... 201610100169.3

(51) Int. Cl.
*H02M 5/458*     (2006.01)
*H02M 7/483*     (2007.01)

(52) U.S. Cl.
CPC ......... *H02M 5/4585* (2013.01); *H02M 7/483* (2013.01); *H02M 2007/4835* (2013.01)

(58) Field of Classification Search
CPC ......... H02M 7/7575; H02M 2001/008; H02M 2001/67; H02M 2001/77
See application file for complete search history.

(56) References Cited

U.S. PATENT DOCUMENTS

| 6,519,169 B1 * | 2/2003 | Asplund ................. H02M 7/48 363/132 |
| 2009/0161398 A1 * | 6/2009 | Benaboud ........... H02M 5/4585 363/131 |

(Continued)

FOREIGN PATENT DOCUMENTS

| CN | 101258670 A | 9/2008 |
| CN | 101707443 A | 5/2010 |

(Continued)

OTHER PUBLICATIONS

Machine Translation of WO2014001079 (Year: 2014).*

(Continued)

*Primary Examiner* — Peter M Novak
(74) *Attorney, Agent, or Firm* — Harness, Dickey & Pierce, P.L.C.

(57) ABSTRACT

A modular multilevel converter and a power electronic transformer is provided. The modular multilevel converter includes: a low-frequency AC to DC conversion module, comprising three branch circuits connected in parallel between output ends, each branch circuit being formed of multiple IGBT half-bridge circuits connected in series, and an electric coupling point of two adjacent IGBT half-bridge circuits in a middle position of the branch circuit being connected to a voltage input end Vin; a DC to high-frequency AC conversion module, connected between the output ends, the DC to high-frequency AC conversion module being formed of multiple IGBT half-bridge circuits connected in series, the DC to high-frequency AC conversion module having multiple sets of output ends. The MMC (Continued)

and power electronic transformer includes a smaller volume, lower cost and better stability in use.

15 Claims, 5 Drawing Sheets

(56) References Cited

U.S. PATENT DOCUMENTS

| | | | |
|---|---|---|---|
| 2015/0155716 A1 | 6/2015 | Balda et al. | |
| 2015/0250027 A1* | 9/2015 | Takano | H05B 6/62 219/664 |
| 2015/0311724 A1* | 10/2015 | Callanan | H02J 7/025 307/104 |
| 2015/0365003 A1 | 12/2015 | Sadwick | |
| 2016/0231366 A1* | 8/2016 | Choi | G01R 21/06 |
| 2019/0296654 A1* | 9/2019 | Azidehak | H02M 5/4585 |

FOREIGN PATENT DOCUMENTS

| | | |
|---|---|---|
| CN | 103762861 A | 4/2014 |
| CN | 103762879 A | 4/2014 |
| CN | 104393614 A | 3/2015 |
| CN | 104410260 A | 3/2015 |
| CN | 104638940 A | 5/2015 |
| CN | 104796025 A | 7/2015 |
| EP | 2845303 A1 | 3/2015 |
| FR | 3017259 A1 | 8/2015 |
| WO | WO-2011141059 A1 | 11/2011 |
| WO | WO 2014001079 A1 | 1/2014 |

OTHER PUBLICATIONS

International Search Report and Written Opinion dated May 11, 2017.
Chinese Office Action dated Sep. 30, 2018.
Office Action for Chinese Patent Application No. 201610100169.3 dated Jun. 11, 2019.

* cited by examiner

MODULAR MULTILEVEL CONVERTER AND POWER ELECTRONIC TRANSFORMER

PRIORITY STATEMENT

This application is the national phase under 35 U.S.C. § 371 of PCT International Application No. PCT/EP2017/053833 which has an International filing date of Feb. 21, 2017, which designated the United States of America and which claims priority to Chinese patent application number CN 201610100169.3 filed Feb. 23, 2016, the entire contents of which are hereby incorporated herein by reference.

FIELD

An embodiment of present invention relates to the technical field of transformers, in particular to a modular multilevel converter (MMC) and a power electronic transformer.

BACKGROUND ART

A transformer is a key apparatus used in a power system. In a power system, after a transformer increases a voltage outputted by a power station, the electricity is transmitted over a long distance, and once it has arrived at its destination, a transformer is used again to reduce the voltage for use by a user. Thus, the transformer is one of the most common and important apparatuses in the entire power system.

Referring to FIG. 1, a conventional transformer comprises three main parts, namely a core, a primary coil and a secondary coil. The primary coil and secondary coil are wound separately onto the core, the primary coil being connected to a power source, and the secondary coil being connected to a load. The core, which is generally made of iron, provides a magnetic circuit for the primary side and secondary side of the transformer, and isolates the primary side from the secondary side. However, such a transformer is large in volume and heavy, and once the voltage waveform of the primary side is determined, the voltage waveform of the secondary side is also determined, and cannot be controlled; the waveform size, frequency and quality cannot be regulated. Furthermore, such a transformer lacks redundancy; if a problem should occur, it must be shut down to be overhauled. As user demands change, more and more non-linear loads and harmonic loads are arising; the load demands are ever greater, and are intermittent and diverse in nature. In response to these conditions, power electronic transformers have appeared. An existing power electronic transformer consists of three stages, namely a high-voltage stage, an isolation stage and a low-voltage stage, and employs a modular cascaded structure. In order to make current harmonics on the primary side smaller, a phase-shifting transformer must be added under each cascaded module. However, a phase-shifting transformer has a large volume and a high cost.

SUMMARY

At least one embodiment of the present invention proposes an MMC and a power electronic transformer with a smaller volume, lower cost and better stability in use.

At least one embodiment of the present invention provides an MMC including a low-frequency AC to DC conversion module having three branch circuits connected in parallel between output ends $V_1$, $V_2$, each branch circuit being formed of multiple IGBT half-bridge circuits connected in series, and an electric coupling point $N_0$ of two adjacent IGBT half-bridge circuits in a middle position of the branch circuit being connected to a voltage input end $V_{in}$ and a DC to high-frequency AC conversion module, connected between the output ends $V_1V_2$, the DC to high-frequency AC conversion module being formed of multiple IGBT half-bridge circuits connected in series. The DC to high-frequency AC conversion module has multiple sets of output ends, each set of output ends include a first output end $V_3$ and a second output end $V_4$, the first output end $V_3$ being connected to an electric coupling point $N_1$ between two adjacent IGBT half-bridge circuits amongst the IGBT half-bridge circuits, and the second output end $V_4$ being connected to an electric coupling point $N_2$ between another two adjacent IGBT half-bridge circuits amongst the IGBT half-bridge circuits.

At least one embodiment of the present invention provides a power electronic transformer, including an MMC, multiple high-frequency transforming modules, each high-frequency transforming module being connected to the corresponding first output end $V_3$ and the corresponding second output end $V_4$, and multiple high-frequency AC to low-frequency AC conversion modules, each high-frequency AC to low-frequency AC conversion module being connected to the corresponding high-frequency transforming module.

BRIEF DESCRIPTION OF THE DRAWINGS

Preferred embodiments of the present invention are described in detail below with reference to the accompanying drawings, to give those skilled in the art a clearer understanding of the abovementioned and other features and advantages of the present invention.

Drawings.

Figure 1:
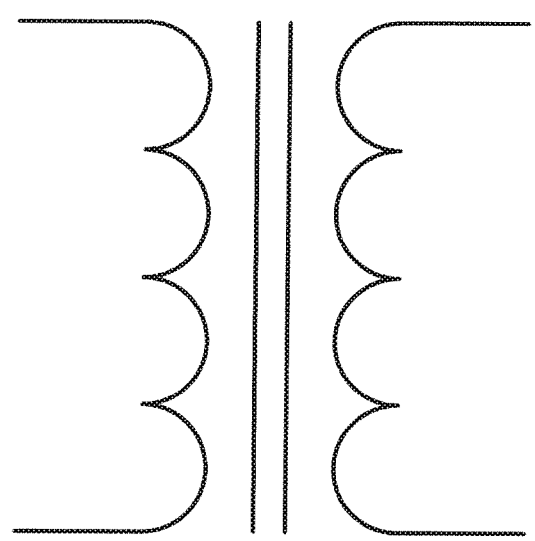
FIG. 1 is a structural schematic diagram of a conventional transformer.

The labels used in the abovementioned accompanying drawings are as follows:
100 power electronic transformer
10 MMC
12 low-frequency AC to DC conversion module
122 branch circuit
123 IGBT half-bridge circuit
124 first connection terminal
125 second connection terminal
13 DC to high-frequency AC conversion module
20 high-frequency transforming module
30 high-frequency AC to low-frequency AC conversion module
$N_0$, $N_1$, $N_2$ electric coupling points
Vin voltage input end
L inductor
$IGBT_1$ first IGBT
$IGBT_2$ second IGBT IGBT$_3$, IGBT$_4$, IGBT$_5$, IGBT$_6$, IGBT$_7$, IGBT$_8$ IGBTs
C$_1$ first capacitor
C$_2$ second capacitor
C$_3$ third capacitor
V$_1$, V$_2$, V$_5$, V$_6$ output ends
V$_3$ first output end
V$_4$ second output end
D$_1$, D$_2$, D$_3$, D$_4$ diodes
V$_{out}$ voltage output end

DETAILED DESCRIPTION OF EXAMPLE EMBODIMENTS

At least one embodiment of the present invention provides an MMC, including a low-frequency AC to DC conversion module having three branch circuits connected in parallel between output ends V$_1$, V$_2$, each branch circuit being formed of multiple IGBT half-bridge circuits connected in series, and an electric coupling point No of two adjacent IGBT half-bridge circuits in a middle position of the branch circuit being connected to a voltage input end Vin. The MMC also has a DC to high-frequency AC conversion module, connected between the output ends V$_1$V$_2$, the DC to high-frequency AC conversion module being formed of multiple IGBT half-bridge circuits connected in series, the DC to high-frequency AC conversion module having multiple sets of output ends, each set of output ends comprising a first output end V$_3$ and a second output end V$_4$. The first output end V$_3$ is connected to an electric coupling point N$_1$ between two adjacent IGBT half-bridge circuits amongst the IGBT half-bridge circuits, and the second output end V$_4$ is connected to an electric coupling point N$_2$ between another two adjacent IGBT half-bridge circuits amongst the IGBT half-bridge circuits.

In a schematic embodiment of the MMC, the IGBT half-bridge circuit comprises a first capacitor C$_1$, a first IGBT (IGBT$_1$) and a second IGBT (IGBT$_2$). The first IGBT (IGBT$_1$) and the second IGBT (IGBT$_2$) are connected in series and then connected in parallel with the first capacitor C$_1$. A collector of the first IGBT (IGBT$_1$) is connected to a positive terminal of the first capacitor C$_1$, an emitter of the first IGBT (IGBT$_1$) is connected to a collector of the second IGBT (IGBT$_2$) and serves as a first connection terminal, and an emitter of the second IGBT (IGBT$_2$) is connected to a negative terminal of the first capacitor C$_1$ and serves as a second connection terminal. The second connection terminal is connected to the first connection terminal of the adjacent IGBT half-bridge circuit.

In a schematic embodiment of the MMC, the electric coupling point between every two adjacent IGBT half-bridge circuits in the DC to high-frequency AC conversion module is connected to the first output end V$_3$ or the second output end V$_4$.

In a schematic embodiment of the MMC, the low-frequency AC to DC conversion module also comprises an even number of inductors L, the inductors L being connected in series in middle positions of the branch circuits; moreover, the inductors L are connected in series between the first connection terminal and the second connection terminal adjacent thereto, and an electric coupling point N$_0$ in the middle of the even number of inductors L is connected to the voltage input end Vin.

At least one embodiment of the present invention provides a power electronic transformer, including an MMC, multiple high-frequency transforming modules, each high-frequency transforming module being connected to the corresponding first output end V3 and the corresponding second output end V4, and multiple high-frequency AC to low-frequency AC conversion modules, each high-frequency AC to low-frequency AC conversion module being connected to the corresponding high-frequency transforming module.

In a schematic embodiment of the power electronic transformer, the high-frequency transforming module comprises a transformer T$_1$ and a second capacitor C$_2$, the primary coil of the transformer T$_1$ is connected to the corresponding first output end V$_3$ and the corresponding second output end V$_4$, and output ends V$_5$, V$_6$ of the secondary coil of the transformer T$_f$ are connected to the high-frequency AC to low-frequency AC conversion module.

In a schematic embodiment of the power electronic transformer, the high-frequency AC to low-frequency AC conversion module has multiple diodes (D$_1$, D$_2$, D$_3$, D$_4$), a third capacitor C$_3$ and multiple IGBTs (IGBT$_3$, IGBT$_a$, IGBT$_5$, IGBT$_6$, IGBT$_7$, IGBT$_8$). The diode D$_1$ and the diode D$_2$ form a first bridge arm and the diode D$_3$ and the diode D$_4$ form a second bridge arm. An electric coupling point between the diode D$_1$ and the diode D$_2$ is connected to the output end V$_5$, and an electric coupling point between the diode D$_3$ and the diode D$_4$ is connected to the output end V$_6$. The IGBT (IGBT$_3$) and the IGBT (IGBT$_4$) form a third bridge arm, the IGBT (IGBT$_5$) and the IGBT (IGBT$_6$) form a fourth bridge arm, and the IGBT (IGBT$_7$) and the IGBT (IGBT$_8$) form a fifth bridge arm. The third capacitor C$_3$, the first bridge arm, the second bridge arm, the third bridge arm, the fourth bridge arm and the fifth bridge arm are connected in parallel. Three voltage output ends (V$_{out}$) are connected respectively to an electric coupling point between the IGBT (IGBT$_3$) and the IGBT (IGBT$_4$), an electric coupling point between the IGBT (IGBT$_5$) and the IGBT (IGBT$_6$), and an electric coupling point between the IGBT (IGBT$_7$) and the IGBT (IGBT$_8$).

It can be seen from the solution above that in the MMC and power electronic transformer of the present invention, the low-frequency AC to DC conversion module and the DC to high-frequency AC conversion module both comprise multiple IGBT half-bridge circuits connected in series. IGBT half-bridge circuits are used, with no need for a phase-shifting transformer; this helps to reduce volume and costs. Furthermore, the DC to high-frequency AC conversion module has multiple output ends, and the voltage value of each output end may be set according to actual demands. When one set of output ends develops a fault, the other output ends can be used normally, with no need for immediate shutdown and overhaul; this helps to lower costs, and increases stability of use.

Figure 2:
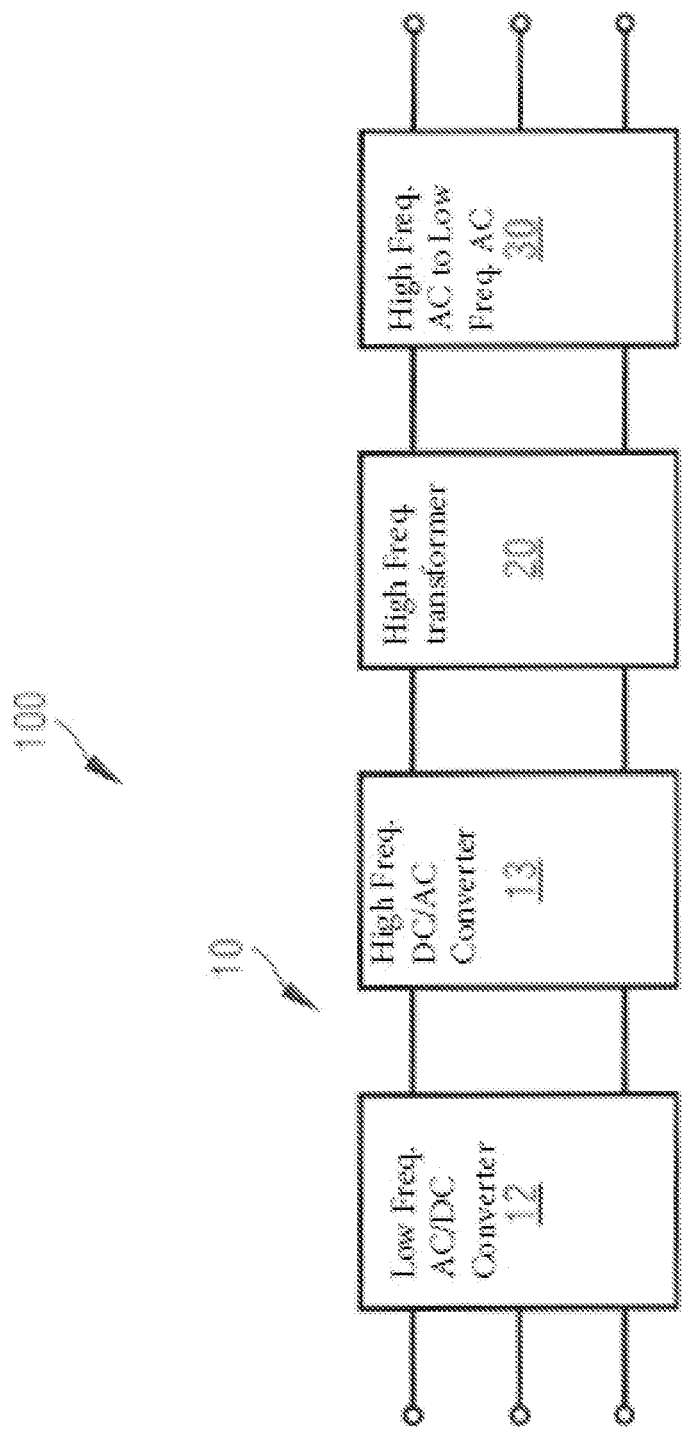
FIG. 2 is a structural schematic diagram of the power electronic transformer in an embodiment of the present invention.

In order to clarify the object, technical solution and advantages of the present invention, the present invention is explained in further detail below by way of embodiments. FIG. 2 is a structural schematic diagram of the power electronic transformer in an embodiment of the present invention. Referring to FIG. 2, the power electronic transformer 100 in this embodiment comprises a modular multilevel converter (MMC) 10, multiple high-frequency transforming modules 20 and multiple high-frequency AC to low-frequency AC conversion modules 30, wherein the MMC 10 comprises a low-frequency AC to DC conversion module 12 and a DC to high-frequency AC conversion module 13.

Figure 3:
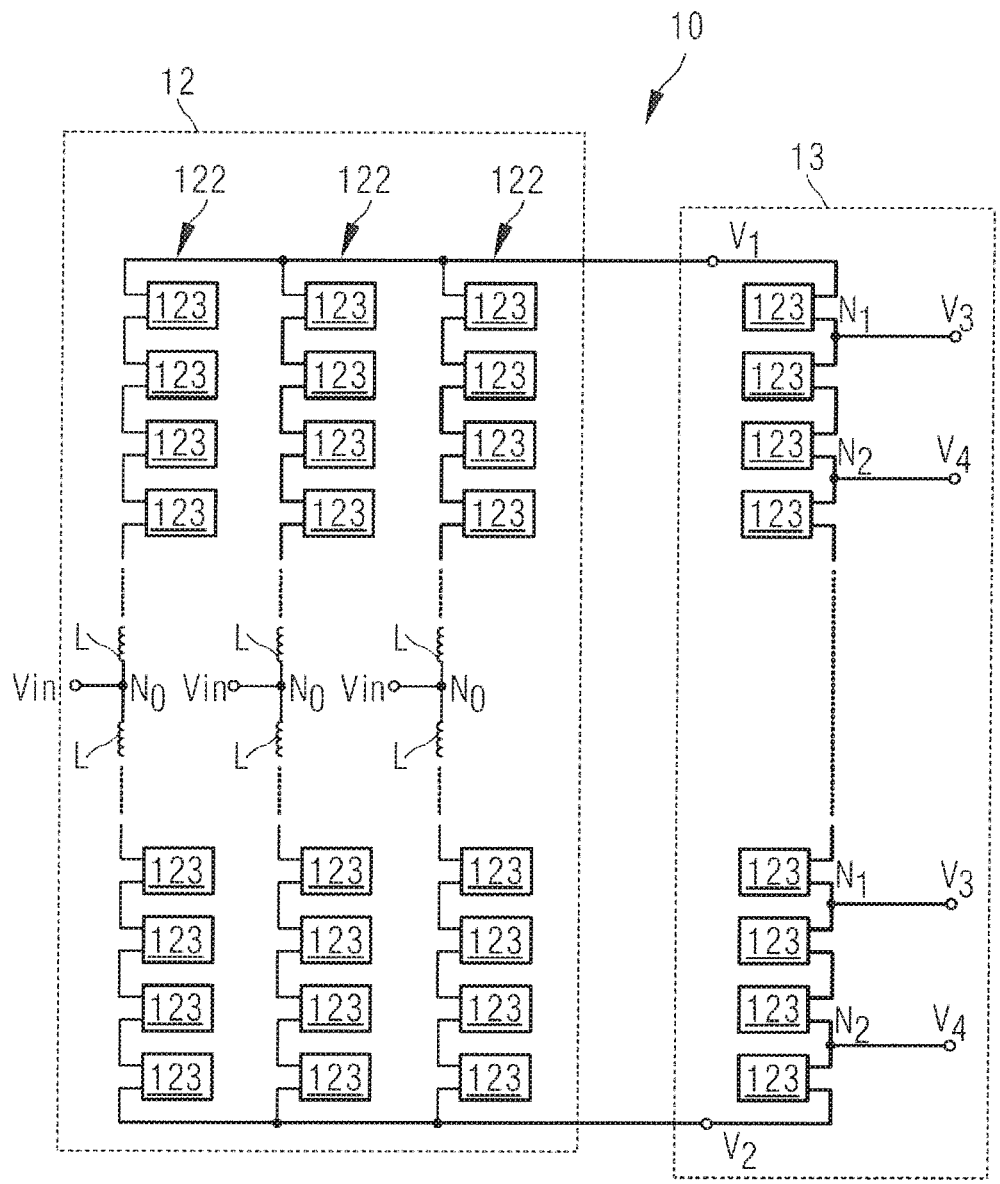
FIG. 3 is a topological structural diagram of an embodiment of the MMC of the power electronic transformer shown in FIG. 2.

Specifically, FIG. 3 is a topological structural diagram of an embodiment of the MMC of the power electronic transformer shown in FIG. 2. Referring to FIG. 3, the low-frequency AC to DC conversion module 12 comprises three branch circuits 122 connected in parallel between output ends $V_1$ and $V_2$. Each branch circuit 122 is formed of multiple IGBT half-bridge circuits 123 connected in series, and an electric coupling point N0 of two adjacent IGBT half-bridge circuits 123 in a middle position of the branch circuit 122 is connected to a voltage input end Vin. There are three voltage input ends $V_{in}$, each corresponding to one phase of three-phase power. IGBT means Insulated Gate Bipolar Transistor. An IGBT is a compound fully-controlled voltage-driven power semiconductor device formed from a BJT (bipolar junction transistor) and a MOS (insulated gate field effect transistor), and combines the advantages of high input impedance of a MOSFET and low conduction voltage drop of a GTR.

Figure 4:
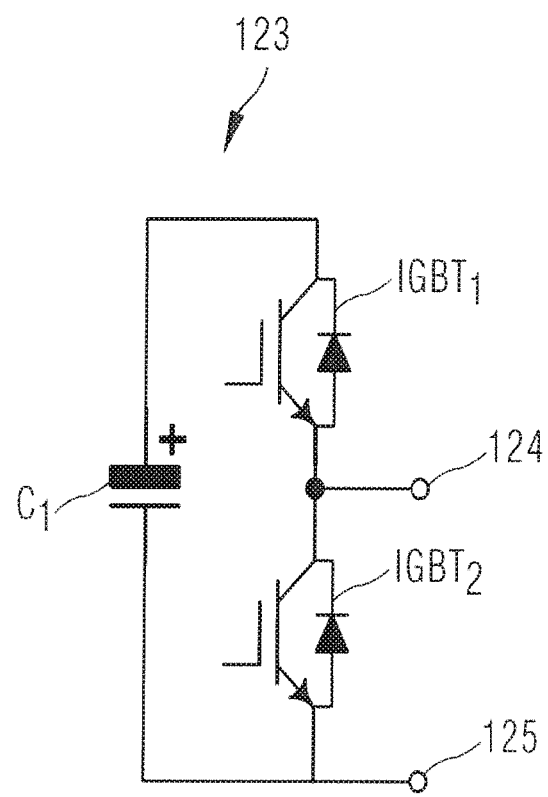
FIG. 4 is a circuit diagram of an embodiment of an IGBT half-bridge circuit of the MMC shown in FIG. 3.

FIG. 4 is a circuit diagram of an embodiment of an IGBT half-bridge circuit of the MMC shown in FIG. 3. Referring to FIG. 4 too, the IGBT half-bridge circuit 123 comprises a first capacitor C1, a first IGBT ($IGBT_1$) and a second IGBT ($IGBT_2$). The first IGBT ($IGBT_1$) and second IGBT ($IGBT_2$) are connected in series, and then connected in parallel with the first capacitor $C_1$. The collector of the first IGBT ($IGBT_1$) is connected to a positive terminal of the first capacitor $C_1$, the emitter of the first IGBT ($IGBT_1$) is connected to the collector of the second IGBT ($IGBT_2$) and serves as a first connection terminal 124, and the emitter of the second IGBT ($IGBT_2$) is connected to a negative terminal of the first capacitor C1 and serves as a second connection terminal 125; the second connection terminal 125 is connected to the first connection terminal 124 of an adjacent IGBT half-bridge circuit 123. It must be explained that the electronic elements contained in the IGBT half-bridge circuit 123, and the connections between the electronic elements, are not restricted to those shown in FIG. 4. The structure of the IGBT half-bridge circuit 123 may be set according to actual demands.

The low-frequency AC to DC conversion module 12 also comprises an even number of inductors L. The inductors L are connected in series between the two adjacent IGBT half-bridge circuits 123 in the middle positions of the branch circuits 122. Moreover, the inductors L are connected in series between the first connection terminal 124 and the second connection terminal 125 adjacent thereto. An electric coupling point in the middle of the even number of inductors L is connected to the voltage input end $V_{in}$. In other words, for each branch circuit 122, the electric coupling point N0 shown in FIG. 3 is located in the exact middle of the branch circuit 122, with the electronic components on the branch circuit 122 being in a symmetrical relationship relative to the electric coupling point N0. In this embodiment, each branch circuit 122 comprises two inductors L, which are located above and below the electric coupling point $N_0$ respectively.

The DC to high-frequency AC conversion module 13 is connected between output ends $V_1$ and $V_2$. The DC to high-frequency AC conversion module 13 is formed of multiple IGBT half-bridge circuits 123 connected in series. The DC to high-frequency AC conversion module 13 has multiple sets of output ends, each set of output ends comprising a first output end $V_3$ and a second output end $V_4$. The first output end $V_3$ is connected to an electric coupling point $N_1$ between two adjacent IGBT half-bridge circuits 123 amongst the IGBT half-bridge circuits 123; the second output end V is connected to an electric coupling point $N_2$ between another two adjacent IGBT half-bridge circuits 123 amongst the IGBT half-bridge circuits 123. In this embodiment, the electric coupling point of every two adjacent IGBT half-bridge circuits 123 in the DC to high-frequency AC conversion module 13 is connected to a first output end $V_3$ or second output end $V_4$.

It can be seen from FIG. 3 that, amongst the IGBT half-bridge circuits 123 of the DC to high-frequency AC conversion module 13 counted from top to bottom, the electric coupling point i between the first IGBT half-bridge circuit 123 and second IGBT half-bridge circuit 123 is connected to a first output end $V_3$, while the electric coupling point $N_2$ between the third IGBT half-bridge circuit 123 and fourth IGBT half-bridge circuit 123 is connected to a second output end $V_4$. In other words, in this embodiment, the electric coupling point of every two adjacent IGBT half-bridge circuits 123 serves as an output end. However, the present invention is not restricted to this; in other embodiments, the positions of the first output end $V_3$ and second output end $V_4$ may be determined according to actual demands on output voltages. For example, the electric coupling point between the first IGBT half-bridge circuit 123 and second IGBT half-bridge circuit 123 serves as a first output end, and the electric coupling point between the fourth IGBT half-bridge circuit 123 and fifth IGBT half-bridge circuit 123 serves as a second output end; no output end is disposed between the third IGBT half-bridge circuit 123 and fourth IGBT half-bridge circuit 123 which are adjacent to each other.

Figure 5:
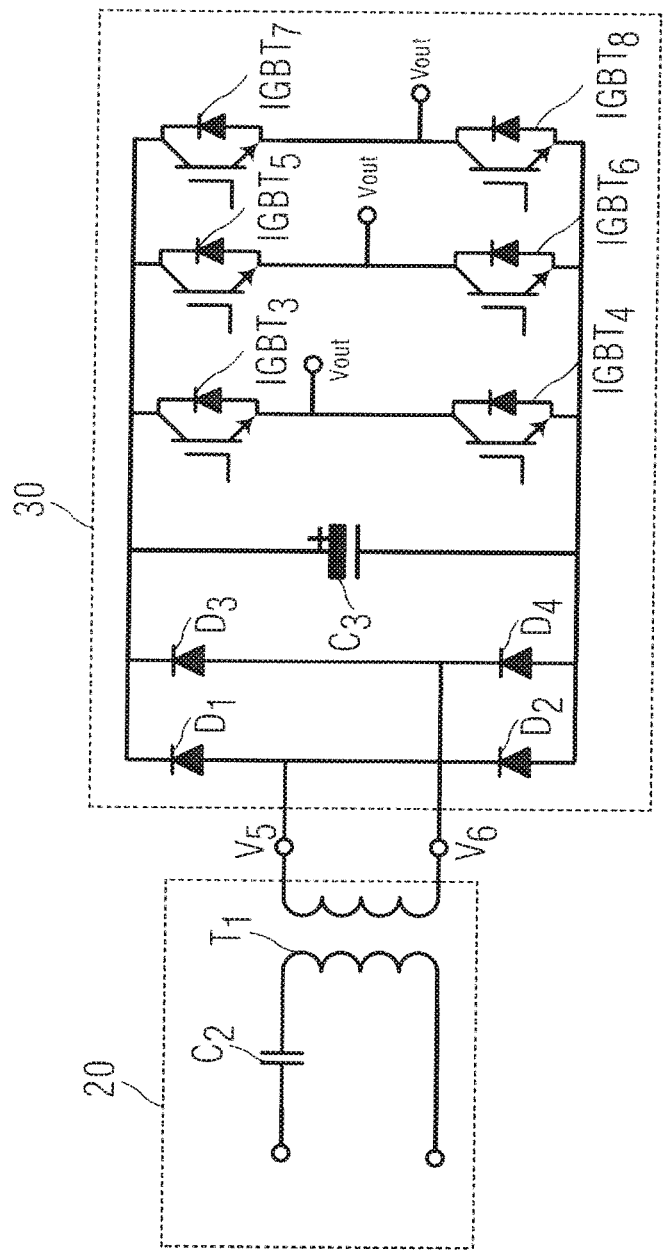
FIG. 5 is a circuit diagram of an embodiment of the high-frequency transforming module and high-frequency AC to low-frequency AC conversion module of the power electronic transformer shown in FIG. 2.

FIG. 5 is a circuit diagram of an embodiment of the high-frequency transforming module and high-frequency AC to low-frequency AC conversion module of the power electronic transformer shown in FIG. 2. Referring to FIG. 5, the high-frequency transforming module 20 comprises a transformer $T_1$ and a second capacitor $C_2$. The primary coil of the transformer $T_1$ is connected to a corresponding first output end $V_3$ and corresponding second output end $V_4$, while output ends $V_5$ and $V_6$ of the secondary coil of the transformer $T_1$ are connected to the high-frequency AC to low-frequency AC conversion module 30. The high-frequency AC to low-frequency AC conversion module 30 comprises multiple diodes $D_1$, $D_2$, $D_3$ and $D_4$, a third capacitor $C_3$ and multiple IGBTs ($IGBT_3$, $IGBT_4$, $IGBT_5$, $IGBT_6$, $IGBT_7$ and $IGBT_8$).

Diode $D_1$ and diode $D_2$ form a first bridge arm, while diode $D_3$ and diode $D_4$ form a second bridge arm. An electric coupling point between diode $D_1$ and diode $D_2$ is connected to output end $V_5$, while an electric coupling point between diode $D_3$ and diode $D_4$ is connected to output end $V_6$. The IGBT ($IGBT_3$) and the IGBT ($IGBT_4$) form a third bridge arm, the IGBT ($IGBT_5$) and the IGBT ($IGBT_6$) form a fourth bridge arm, the IGBT ($IGBT_7$) and the IGBT ($IGBT_8$) form a fifth bridge arm. The third capacitor $C_3$, first bridge arm, second bridge arm, third bridge arm, fourth bridge arm and fifth bridge arm are connected in parallel. Three voltage output ends Vout are connected respectively to an electric coupling point between the IGBT ($IGBT_3$) and the IGBT ($IGBT_4$), an electric coupling point between the IGBT ($IGBT_5$) and the IGBT ($IGBT_6$), and an electric coupling point between the IGBT ($IGBT_7$) and the IGBT ($IGBT_8$).

During operation, since the three branch circuits 122 of the low-frequency AC to DC conversion module 12 comprise multiple IGBT half-bridge circuits 123, when three-phase power is inputted via the voltage input ends Vin, low-frequency AC power can be converted to DC power through the on/off switching of the first IGBT ($IGBT_1$) and the second IGBT ($IGBT_2$), and the DC power is outputted via the output ends $V_1$ and $V_2$. The DC power is inputted via the output ends $V_1$ and $V_2$ to the DC to high-frequency AC conversion module 13. The DC to high-frequency AC conversion module 13 is formed of multiple IGBT half-bridge circuits 123 connected in series. In each IGBT half-bridge circuit 123, when the first IGBT ($IGBT_1$) is conducting, the second IGBT (IGBT$_2$) is shut off; the voltage between the first connection terminal 124 and second connection terminal 125 is then equal to the voltage of the first capacitor C1, so the output voltage is greater than 0. When the first IGBT (IGBT$_1$) is shut off, the second IGBT (IGBT$_2$) is conducting; there is a short circuit between the first connection terminal 124 and second connection terminal 125, so the output voltage is equal to 0.

Since the second connection terminal 125 is connected to the first connection terminal 124 of an adjacent IGBT half-bridge circuit 123, and the first output end V$_3$ or second output end V$_4$ is connected to the electric coupling point between adjacent IGBT half-bridge circuits 123, the voltage between the first output end V$_3$ and second output end V$_4$ is always greater than or equal to 0. At the same time, the DC to high-frequency AC conversion module 13 converts DC power to high-frequency AC power, and is provided with multiple sets of output ends V$_3$ and V$_4$. The number of output ends V3 and V4 and the outputted voltage values may be set arbitrarily according to actual circumstances.

The high-frequency transforming module 20 performs high-voltage isolation on the high-frequency AC power outputted by output ends V$_3$ and V$_4$. Finally, the high-frequency AC to low-frequency AC conversion module 30 converts high-frequency AC power outputted by output ends V$_5$ and V$_6$ of the high-frequency transforming module 20 to low-frequency AC power, and outputs this low-frequency AC power via the voltage output ends V$_{out}$.

The MMC and power electronic transformer of the present invention at least have the following advantages:

1. In the MMC and power electronic transformer of the present invention, the low-frequency AC to DC conversion module and the DC to high-frequency AC conversion module both comprise multiple IGBT half-bridge circuits connected in series. IGBT half-bridge circuits are used, with no need for a phase-shifting transformer; this helps to reduce volume and costs. Furthermore, the DC to high-frequency AC conversion module has multiple output ends, and the voltage value of each output end may be set according to actual demands. When one set of output ends develops a fault, the other output ends can be used normally, with no need for immediate shutdown and overhaul; this helps to lower costs, and increases stability of use.

2. In one embodiment of the MMC and power electronic transformer of the present invention, inductors L are connected in series in a middle position of each branch circuit. Moreover, the inductors L are connected in series between the first connection terminal and the second connection terminal adjacent thereto. Electric coupling points N$_0$ in the middle of the even number of inductors L are connected to the voltage input ends V$_{in}$, thereby making the input voltage more stable.

3. In one embodiment of the MMC and power electronic transformer of the present invention, the low-frequency AC to DC conversion module and the DC to high-frequency AC conversion module are both provided with IGBT half-bridge circuits, and the low-frequency AC to DC conversion module can effectively convert low-frequency AC power to DC power. The IGBT half-bridge circuits can make the voltage values outputted by the DC to high-frequency AC conversion module greater than or equal to 0, and adjustments can be made according to actual circumstances, to meet different demands of users.

The embodiments above are merely preferred embodiments of the present invention, which are not intended to limit it. Any amendments, equivalent substitutions or improvements etc. made within the spirit and principles of the present invention shall be included in the scope of protection thereof.

The invention claimed is:

1. A modular multilevel converter (MMC), comprising:
    a low-frequency AC to DC conversion module including at least three branch circuits connected in parallel between first output ends, each branch circuit of the at least three branch circuits being formed of multiple first IGBT half-bridge circuits connected in series, and an electric coupling point of two adjacent first IGBT half-bridge circuits of the multiple first IGBT half-bridge circuits, in a middle position of the respective branch circuit, being connected to a voltage input end; and
    a DC to high-frequency AC conversion module, connected between the first output ends, the DC to high-frequency AC conversion module being formed of multiple second IGBT half-bridge circuits connected in series, the DC to high-frequency AC conversion module including multiple sets of second output ends, each set of second output ends including a third output end and a fourth output end, the third output end being directly connected to an electric coupling point between a first pair of two adjacent second IGBT half-bridge circuits of the multiple second IGBT half-bridge circuits, and the fourth output end being directly connected to another electric coupling point between a second pair of two adjacent second IGBT half-bridge circuits different from the first pair of two adjacent second IGBT half-bridge circuits.

2. The MMC of claim 1, wherein each of the IGBT half-bridge circuits comprises a first capacitor, a first IGBT and a second IGBT connected in series, the first IGBT and the second IGBT being further connected in parallel with the first capacitor; a collector of the first IGBT being connected to a positive terminal of the first capacitor, an emitter of the first IGBT being connected to a collector of the second IGBT and serving as a first connection terminal, and an emitter of the second IGBT being connected to a negative terminal of the first capacitor and serving as a second connection terminal; and the second connection terminal being connected to the first connection terminal of an adjacent IGBT half-bridge circuit.

3. The MMC of claim 2, wherein the electric coupling point between every two adjacent IGBT half-bridge circuits of the multiple IGBT half-bridge circuits in the DC to high-frequency AC conversion module is connected to the first output end or the second output end.

4. The MMC of claim 1, wherein the electric coupling point between every two adjacent IGBT half-bridge circuits of the multiple second IGBT half-bridge circuits in the DC to high-frequency AC conversion module is connected to the third output end or the fourth output end.

5. The MMC of claim 1, wherein the low-frequency AC to DC conversion module further includes
    an even number of inductors, the inductors being connected in series in middle positions of the branch circuits and the inductors being connected in series between a first connection terminal and a second connection terminal adjacent thereto, and wherein an electric coupling point, in a middle of the even number of inductors, is connected to the voltage input end.

6. The MMC of claim 1, wherein the at least three branch circuits are connected in parallel between the first output ends, and the DC to high-frequency AC conversion module includes multiple additional second sets of output ends, each additional set of second output ends including a third output end and a fourth output end.

7. A power electronic transformer, comprising:
an MMC, including:
a low-frequency AC to DC conversion module, including at least three branch circuits connected in parallel between first output ends, each branch circuit of the at least three branch circuits being formed of multiple first IGBT half-bridge circuits connected in series, and an electric coupling point of two adjacent first IGBT half-bridge circuits, in a middle position of the branch circuit, being connected to a voltage input end,
a DC to high-frequency AC conversion module, connected between the first output ends, the DC to high-frequency AC conversion module being formed of multiple second IGBT half-bridge circuits connected in series, the DC to high-frequency AC conversion module including multiple sets of second output ends, each set of second output ends including a third output end and a fourth output end, the third output end being connected to an electric coupling point between two adjacent second IGBT half-bridge circuits of the multiple second IGBT half-bridge circuits, and the fourth output end being connected to an electric coupling point between another two adjacent second IGBT half-bridge circuits of the multiple second IGBT half-bridge circuits;
multiple high-frequency transforming modules, each high-frequency transforming module, of the multiple high-frequency transforming modules, being connected to a corresponding third output end and a corresponding fourth output end; and
multiple high-frequency AC to low-frequency AC conversion modules, each high-frequency AC to low-frequency AC conversion module, of the multiple high-frequency AC to low-frequency AC conversion modules, being connected to a corresponding high-frequency transforming module of the of the multiple high-frequency transforming modules.

8. The power electronic transformer of claim 7, wherein each IGBT half-bridge circuit includes a first capacitor, a first IGBT and a second IGBT connected in series, the first IGBT and a second IGBT further being connected in parallel with the first capacitor; a collector of the first IGBT being connected to a positive terminal of the first capacitor, an emitter of the first IGBT being connected to a collector of the second IGBT and serving as a first connection terminal, and an emitter of the second IGBT being connected to a negative terminal of the first capacitor and serving as a second connection terminal, the second connection terminal being connected to the first connection terminal of an adjacent IGBT half-bridge circuit.

9. The power electronic transformer of claim 8, wherein each of the electric coupling points being between two adjacent second IGBT half-bridge circuits in the DC to high-frequency AC conversion module, are each connected to either the first output end or the second output end.

10. The power electronic transformer of claim 8, wherein the low-frequency AC to DC conversion module further includes an even number of inductors, the inductors being connected in series in middle positions of the branch circuits and the inductors being connected in series between a first connection terminal and a second connection terminal adjacent thereto, an electric coupling point in a middle of the even number of inductors being connected to the voltage input end.

11. The power electronic transformer of claim 8, wherein at least one of the high-frequency transforming modules includes a first transformer and a second capacitor, a primary coil of the transformer being connected to a corresponding third output end and a corresponding fourth output end, and output ends of a secondary coil of the first transformer being connected to the high-frequency AC to low-frequency AC conversion module.

12. The power electronic transformer of claim 7, wherein electric coupling points, each of the electric coupling points being between two adjacent IGBT half-bridge circuits in the DC to high-frequency AC conversion module, are each connected to either the third output end or the fourth output end.

13. The power electronic transformer of claim 7, wherein the low-frequency AC to DC conversion module further includes an even number of inductors, the inductors being connected in series in middle positions of the branch circuits and the inductors being connected in series between a first connection terminal and a second connection terminal adjacent thereto, an electric coupling point in a middle of the even number of inductors being connected to the voltage input end.

14. The power electronic transformer of claim 7, wherein at least one of the high-frequency transforming modules includes a first transformer and a second capacitor, a primary coil of the transformer being connected to a corresponding third output end and a corresponding fourth output end, and output ends of a secondary coil of the first transformer being connected to the high-frequency AC to low-frequency AC conversion module.

15. The power electronic transformer of claim 7, wherein at least one of the high-frequency AC to low-frequency AC conversion modules includes multiple diodes, a third capacitor and multiple additional IGBTs, a first two of the multiple diodes forming a first bridge arm and a second two of the multiple diodes forming a second bridge arm, an electric coupling point between one of the two first diodes and one of the two second diodes being connected to the output end, and an electric coupling point between another one of the two first diodes and one of the two second diodes being connected to the output end;
a first IGBT of the multiple additional IGBTs and a second IGBT of the multiple additional IGBTs form a third bridge arm, a third IGBT of the multiple additional IGBTs and a fourth IGBT of the multiple additional IGBTs form a fourth bridge arm, a fifth IGBT of the multiple additional IGBTs and a sixth IGBT of the multiple additional IGBTs form a fifth bridge arm;
the third capacitor, the first bridge arm, the second bridge arm, the third bridge arm, the fourth bridge arm and the fifth bridge arm are connected in parallel; and
three voltage output ends are each connected respectively to an electric coupling point between the first IGBT and the second IGBT of the multiple additional IGBTs, an electric coupling point between the third IGBT and the fourth IGBT of the multiple additional IGBTs, and an electric coupling point between the fifth IGBT and the sixth IGBT of the multiple additional IGBTs.

* * * * *